United States Patent
Taishi et al.

(10) Patent No.: US 9,405,220 B2
(45) Date of Patent: Aug. 2, 2016

(54) OPTICAL SENSOR, IMAGE FORMING DEVICE, AND METHOD FOR CORRECTING TONER CONCENTRATION

(71) Applicant: OMRON Corporation, Kyoto-Shi (JP)

(72) Inventors: Yoshitaka Taishi, Shiga (JP); Hajime Kawai, Kyoto (JP); Junichi Yoshida, Shiga (JP)

(73) Assignee: OMRON CORPORATION, Kyoto-shi (JP)

(*) Notice: Subject to any disclaimer, the term of this patent is extended or adjusted under 35 U.S.C. 154(b) by 0 days.

(21) Appl. No.: 14/470,155

(22) Filed: Aug. 27, 2014

(65) Prior Publication Data
US 2015/0093131 A1 Apr. 2, 2015

(30) Foreign Application Priority Data
Sep. 30, 2013 (JP) ................. 2013-205589

(51) Int. Cl.
*G03G 15/08* (2006.01)
*G03G 15/00* (2006.01)
*G01J 1/44* (2006.01)

(52) U.S. Cl.
CPC .............. *G03G 15/0827* (2013.01); *G01J 1/44* (2013.01); *G03G 15/5058* (2013.01); *G03G 15/556* (2013.01); *G03G 2215/00042* (2013.01)

(58) Field of Classification Search
CPC ........... G03G 15/556; G03G 15/0827; G03G 15/0855; G03G 15/0862; G03G 15/5041; G03G 15/5058; G03G 2215/00042; G03G 2215/00616; G03G 2215/0891
USPC ................. 399/49, 64, 74; 250/214 A, 559.1, 250/559.11; 330/9; 327/307, 362
See application file for complete search history.

(56) References Cited

U.S. PATENT DOCUMENTS

| | | | |
|---|---|---|---|
| 5,789,974 A * | 8/1998 | Ferguson, Jr. | H03F 1/304 330/2 |
| 6,222,471 B1 * | 4/2001 | Nagaraj | H03M 1/1038 341/118 |
| 2005/0030562 A1 | 2/2005 | Hama et al. | |
| 2012/0119930 A1 * | 5/2012 | Kumar | H03F 3/45475 341/118 |
| 2012/0201559 A1 * | 8/2012 | Holland | 399/74 |
| 2013/0004189 A1 * | 1/2013 | Hashiguchi et al. | 399/49 |

FOREIGN PATENT DOCUMENTS

| | | | |
|---|---|---|---|
| DE | 102012218123 A1 * | 4/2014 | |
| JP | 07-015493 B2 | 2/1995 | |
| JP | 11002932 A * | 1/1999 | |
| JP | 2007-101597 A | 4/2007 | |
| JP | 2009-003283 A | 1/2009 | |
| JP | 2010-186827 A | 8/2010 | |

OTHER PUBLICATIONS

Extended European Search Report for Application No. 14182442.5 issued Nov. 26, 2014 (6 pages).

* cited by examiner

*Primary Examiner* — Robert Beatty
(74) *Attorney, Agent, or Firm* — Nutter McClennen & Fish LLP; John J. Penny, Jr.

(57) ABSTRACT

An optical sensor configured to irradiate an object area with light and receive reflected light, amplify a voltage in accordance with the reflected light by an amplifier circuit and a resulting voltage, the optical sensor comprising a recording medium recorded with information indicating a noise component calculated, based on characteristics of an input voltage and an output voltage of the amplifier circuit.

5 Claims, 10 Drawing Sheets

FIG. 1A

During BK toner sensing

FIG. 1B

During CMY toner sensing

Regular reflection
(first light receiving
element) output voltage

Output at the time of
non-lighting sticks to 0 V.

BK

Around high concentration of
BK toner adhesion quantity

FIG. 5B

Diffusion reflection
(second light receiving
element) output voltage

CMY

Output at the time of
non-lighting sticks to 0 V.

Around low concentration of
CMY toner adhesion quantity

FIG. 6A

Around high concentration of BK toner adhesion quantity

FIG. 6B

Around low concentration of CMY toner adhesion quantity

OPTICAL SENSOR, IMAGE FORMING DEVICE, AND METHOD FOR CORRECTING TONER CONCENTRATION

CROSS-REFERENCE TO RELATED APPLICATION

This application claims the benefit of priority from Japanese Patent Application No. 2013-205589 filed on Sep. 30, 2013, the entire contents of which are incorporated herein by reference for all purposes.

BACKGROUND

The present invention relates to an optical sensor, an image forming device, and a method for correcting a toner concentration.

A conventional image forming device includes, a fixing device, a color concentration sensor (also called a toner concentration sensor) such as a reflection type optical sensor with a light emitting element, and a light receiving element so that a concentration of toner formed on an intermediate transfer belt is detected. Specifically, the light emitting element irradiates an area with light causing the toner of the intermediate transfer belt to adhere to the area, and the light receiving element receives reflected light of the irradiated light to output a detection voltage in accordance with a light receiving quantity.

However, in the detection voltage of the color concentration sensor, there is a noise component caused by, for example, a dark current by electrons and holes generated thermally in addition to electrons and holes generated by photoelectric conversion by light, an offset voltage of an amplifier circuit, and a minute bias current flowing in or flowing out with respect to an input terminal of the amplifier circuit. The noise poses a problem since the color concentration sensor cannot precisely sense toner concentration (also called color concentration). Thus, in order to sense the precise toner concentration, it is necessary to correct a noise component. When the noise component is a +voltage, the noise component can be sensed even if the color concentration sensor is driven by a single power supply, and thus, the correction is possible. However, when the noise component is a −voltage, substantially 0 V is outputted if the color concentration sensor is driven by the single power source, so that the noise component cannot be sensed. Thus, the correction is impossible. A technique for solving this problem is disclosed, for example, in Japanese Unexamined Patent Publication No. 2009-003283. In Japanese Unexamined Patent Publication No. 2009-003283, there has been disclosed a method in which the color concentration sensor is driven by a dual power supply, and the noise components of both the +voltage and the −voltage can be sensed, which reduces influence of the offset voltage.

However, as to the technique described in Japanese Unexamined Patent Publication No. 2009-003283, the image forming device needs to be provided with a part to adjust the offset voltage (a configuration to drive an operational amplifier by the dual power supply), which increases the number of parts in the image forming device. One technique for solving this problem is a technique of biasing an output value of the color concentration sensor disclosed in, for example, Japanese Unexamined Patent Publication No. H10-186827 is applied to set the offset voltage to a +voltage. This configuration reduces the influence of the offset voltage even if the amplifier circuit is driven by the single power supply instead of the dual power supply. However, there is a problem in that a dynamic range of the sensor becomes small.

SUMMARY

In accordance with an embodiment of the present invention, there is provided an optical sensor configured to irradiate an object area with light and receive reflected light, amplify a voltage in accordance with the reflected light by an amplifier circuit and a resulting voltage, the optical sensor comprising a recording medium recorded with information indicating a noise component calculated, based on characteristics of an input voltage and an output voltage of the amplifier circuit.

DETAILED DESCRIPTION

With reference to the accompanying drawings, an embodiment of the present invention will be described. The embodiment is provided only as an example, and the present invention is not limited to the embodiment. In the following description, the same parts are given the same reference numerals. Further, since the names and functions of the same parts are similar, detailed descriptions of the same parts are not repeated.

Figure 1A:
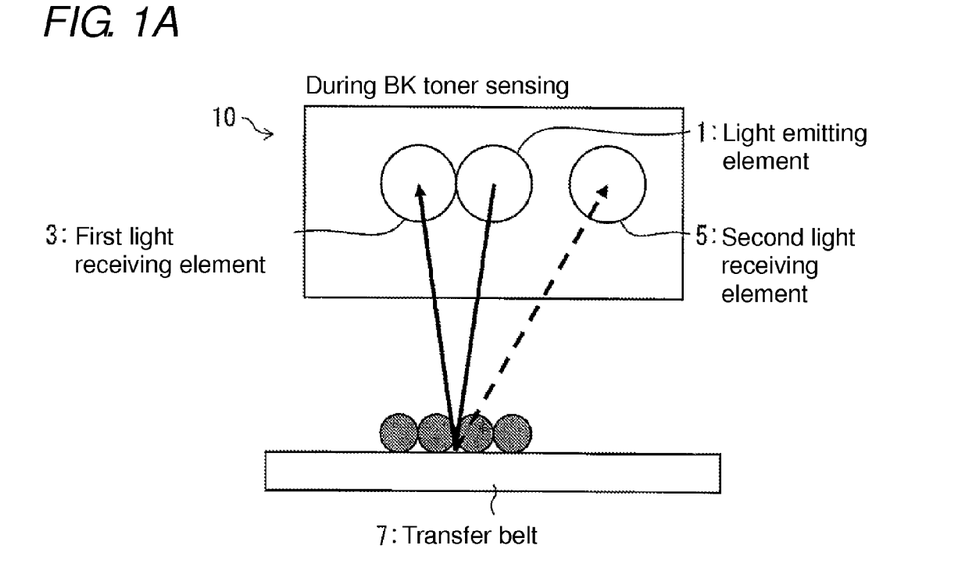
FIGS. 1A and 1B are diagrams illustrating a basic principle of a toner concentration sensor as one example of an optical sensor.
Figure 1B:
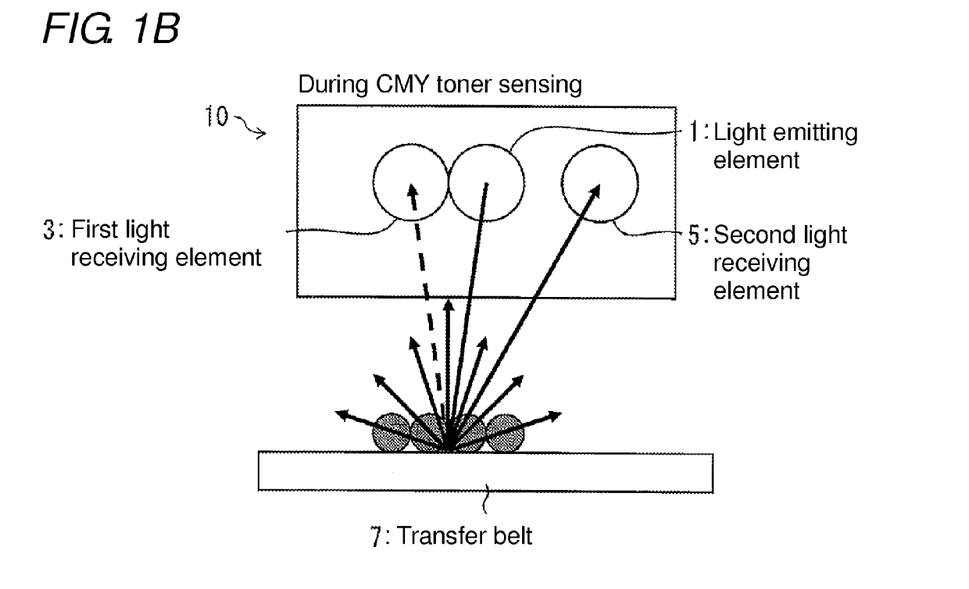

FIGS. 1A and 1B are diagrams illustrating a basic principle of a toner concentration sensor as one example of an optical sensor. FIG. 1A illustrates black (BK) toner sensing, and FIG. 1B illustrates cyan, magenta, or yellow (CMY) toner sensing. As illustrated in FIGS. 1A and 1B, light emitting element 1 and first and second light receiving elements 3, 5 are arranged at positions opposed to intermediate transfer belt 7 in a previous stage of a fixing device. Specifically, light emitting element 1 is arranged so as to irradiate a toner adhesion area of intermediate transfer belt 7 with light at a predetermined inclination angle. Moreover, first and second light receiving elements 3, 5 are arranged so as to receive light reflected at intermediate transfer belt 7, and each output a voltage corresponding to the light.

First light receiving element 3 is a light receiving part to detect regular reflected light, and second light-receiving element 5 is a light receiving part to detect diffusion reflected light. Since BK toner is characterized by lower light reflectance, as an adhesion quantity in the toner adhesion area becomes larger, a light quantity of the regular reflected light tends to decrease, and a light quantity of the diffusion reflected light tends to gently increase. Moreover, when a value of the adhesion quantity of the BK toner reaches a certain value or more, the light quantities of both the regular reflected light and the diffusion reflected light hardly change. As the adhesion quantity of the BK toner increases, output of first light receiving element 3 decreases, and output of second light receiving element 5 gently becomes higher and then, stays substantially constant.

On the other hand, since CMY toner is characterized by higher light reflectance, as an adhesion quantity in the toner adhesion area becomes larger, the light quantity of the regular reflected light tends to decrease, and then, increase once it reaches a certain quantity, while the light quantity of the diffusion reflected light tends to increase. Moreover, when a value of the adhesion quantity of the CMY toner reaches a certain value or more, the light quantities of both the regular reflected light and the diffusion reflected light hardly change. Thus, as the adhesion quantity of the CMY toner increases, the output of second light receiving element 5 becomes higher and then, substantially constant, while the output of first light receiving element 3 decreases, and then, changes with a tendency to increase, and then stays substantially constant.

Figure 2A:
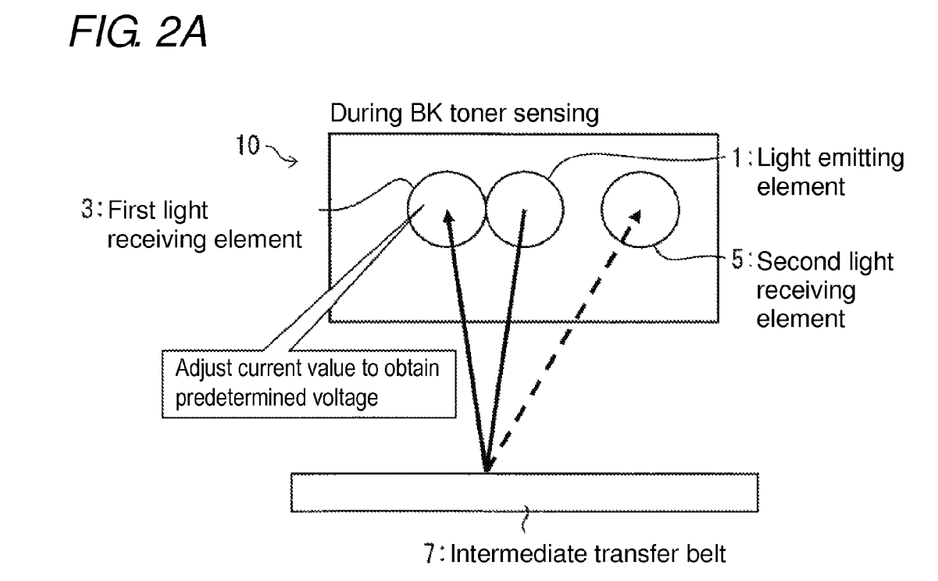
FIGS. 2A and 2B are first set of diagrams illustrating one example of a method of adjustment in the toner concentration sensor.
Figure 2B:
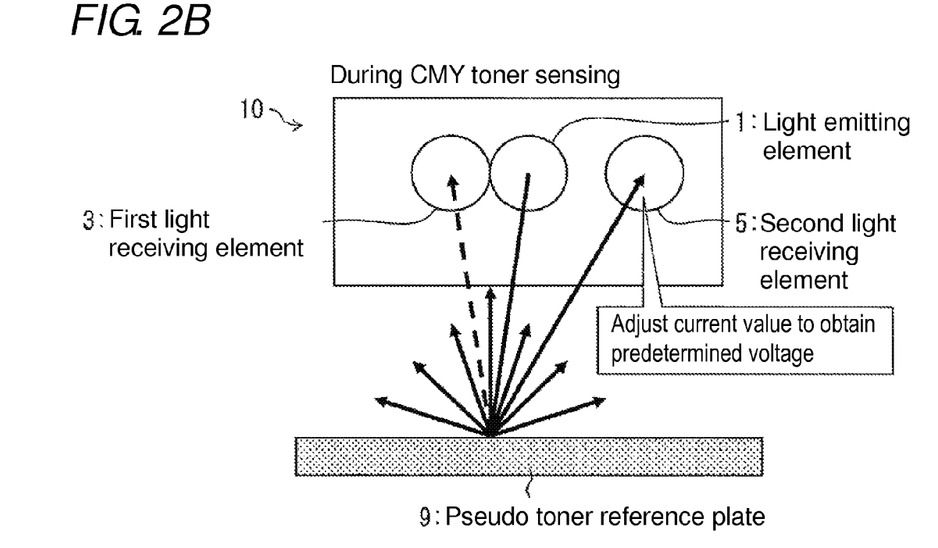

In order that toner concentration sensor 10 detects a precise toner concentration in accordance with the above-described principle, correction needs to be performed in accordance with the following correction method. FIGS. 2A and 2B are diagrams illustrating one example of the method of correction in toner concentration sensor 10. FIG. 2A illustrates the BK toner sensing, and FIG. 2B illustrates the CMY toner sensing. As illustrated in FIG. 2A, a forward current of light emitting element 1 is adjusted, using intermediate transfer belt 7 (in a state where the toner does not adhere). Moreover, as illustrated in FIG. 2B, a voltage of second light receiving element 5 is adjusted, using pseudo-toner reference plate 9 (in a state where the toner does not adhere) in place of intermediate transfer belt 7.

Specifically, the forward current of light emitting element 1 is adjusted so that an output voltage of first light receiving element 3 when a reflecting object (such as an intermediate transfer belt 7) is sensed within a prescribed range. A circuit constant is changed so that an output voltage of second light receiving element 5 is within a prescribed range in a state where the adjusted current value is fixed. This is achieved using, for example, a gain adjustment of a current-voltage conversion circuit and an amplifier circuit (OP-AMP) from second light receiving element 5.

Figure 3A:
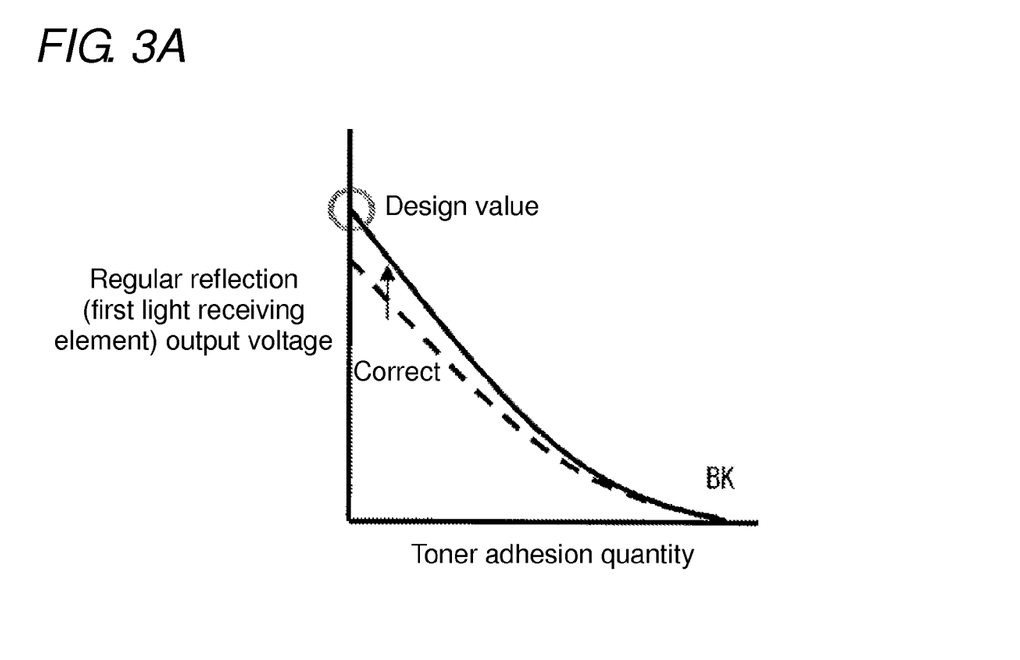
FIGS. 3A and 3B are second set of diagrams illustrating one example of the method of adjustment in the toner concentration sensor.
Figure 3B:
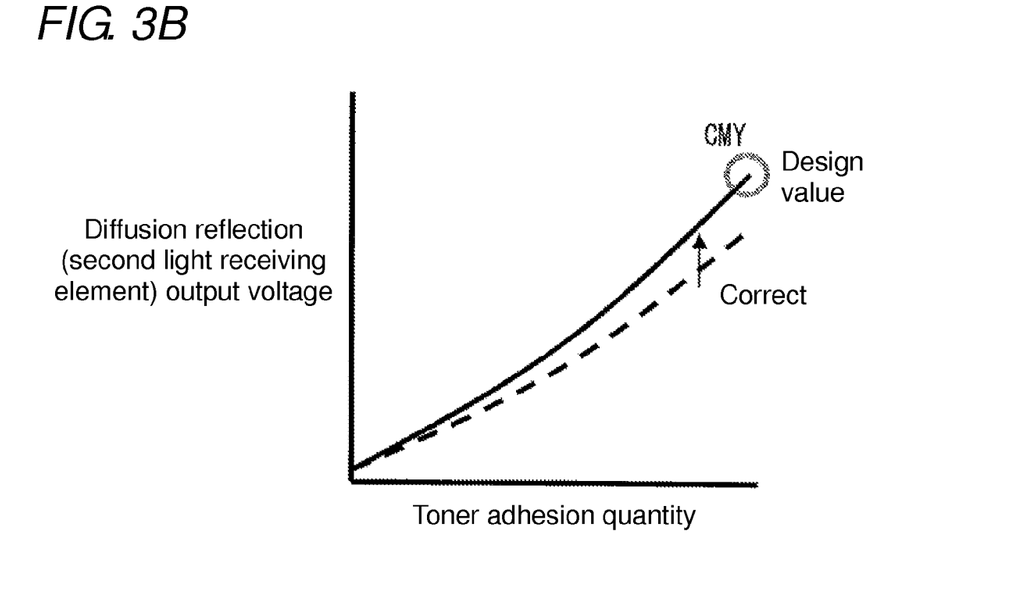

Moreover, a current value of light emitting element 1 is adjusted so that the output voltages of first and second light receiving elements 3, 5 are within prescribed ranges in accordance with deterioration in light quantity of light emitting element 1, variation in attachment of light emitting element 1, and first and second light receiving elements 3, 5, and deterioration in the sensing object (such as intermediate transfer belt 7) and the like (refer to FIGS. 3A, 3B).

Figure 4A:
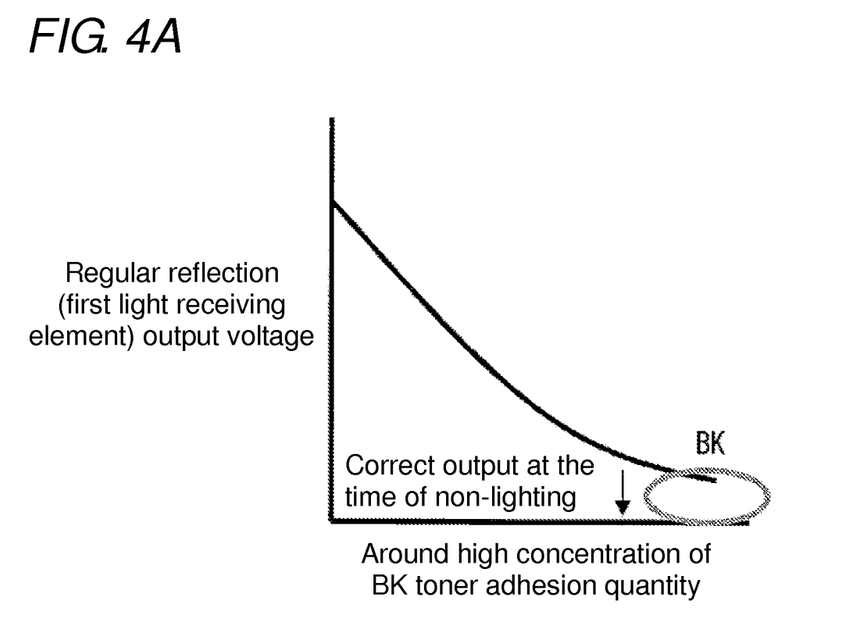
FIGS. 4A and 4B are first set of diagrams illustrating one example of output results of first and second light receiving elements.
Figure 4B:
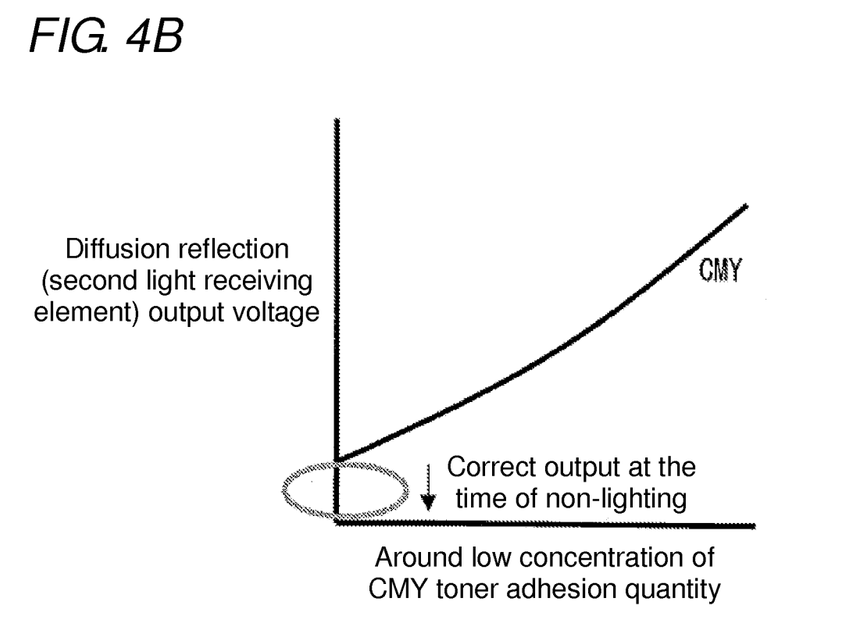

Furthermore, beside the above-described adjustment, in order to increase detection accuracy, correction to eliminate a noise component caused by a circuit is performed. FIGS. 4A, 4B are first set of diagrams illustrating one example of output results of the first and second light receiving elements 3, 5.

Circles in FIGS. 4A, 4B indicate outputs of first and second light receiving elements 3, 5 at the time of non-lighting of light emitting element 1. At this time, first and second light receiving elements 3, 5 each output an output value of +voltage, which is the noise component, and this noise component is affected by for example, a dark current by electrons and holes generated thermally in addition to electrons and holes generated by photoelectric conversion by light, an offset voltage of the amplifier circuit, and a minute bias current flowing in or flowing out with respect to an input terminal of the amplifier circuit. Accordingly, in order to eliminate the noise component, correction needs to be performed, in which the noise component at the time of non-lighting of light emitting element 1 is subtracted from the output value at the time of toner concentration sensing. In this manner, when the outputs of first and second light receiving elements 3, 5 at the time of non-lighting of light emitting element 1 are each the +voltage, the output value can be used as the noise component to perform the correction.

On the other hand, since toner concentration sensor 10 is driven by a single power supply, when the outputs of first and second light receiving elements 3, 5 at the time of non-lighting of light emitting element 1 are each at substantially 0 V, the noise component cannot be known from the output value, which disables performance of the correction. Thus, the noise component of the −voltage is calculated beforehand in accordance with a mathematical operation method described later, and is recorded on a recording medium. The correction is performed, using the noise component recorded on the recording medium. Not only the noise component of the −voltage but the noise component of the +voltage may be recorded on the recording medium.

Figure 5A:
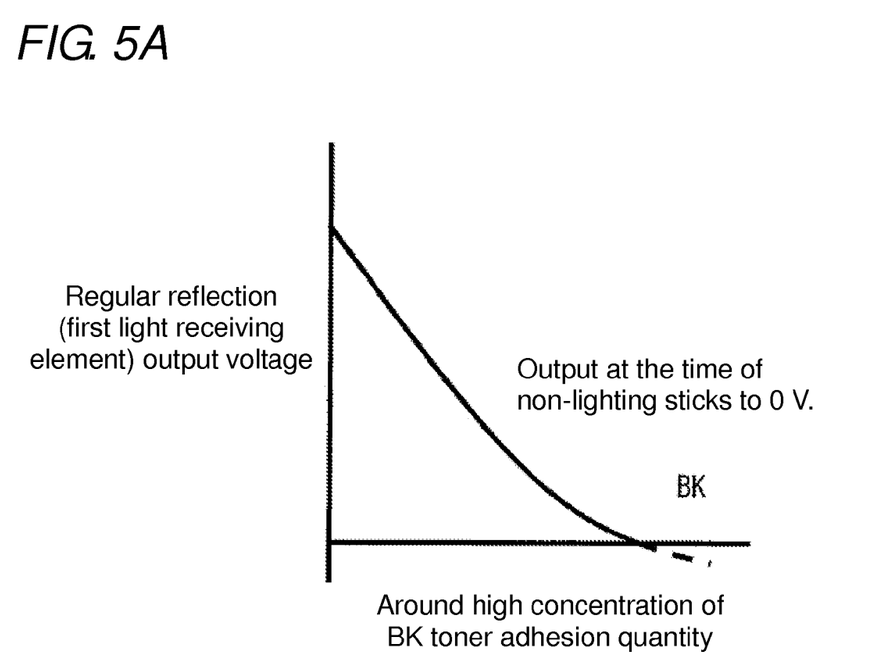
FIGS. 5A and 5B are second set of diagrams illustrating one example of the output results of the first and second light receiving elements.
Figure 5B:
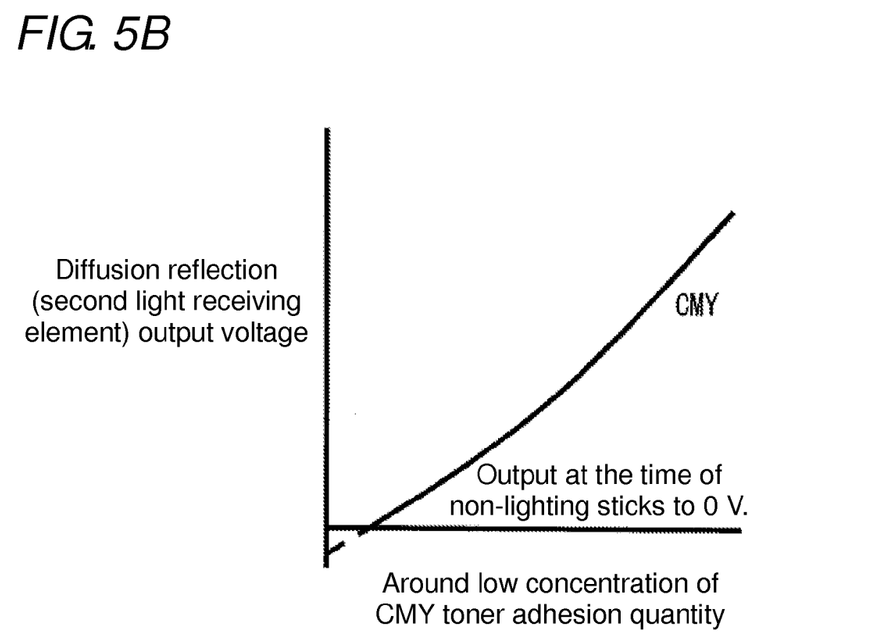

Here, a correction method in the case where first and second light receiving elements 3, 5 output substantially 0 V at the time of non-lighting of light emitting element 1 will be described with reference to FIGS. 5A, 5B. FIGS. 5A, 5B are second set of diagrams illustrating one example of output results of the first and second light emitting elements.

Figure 6A:
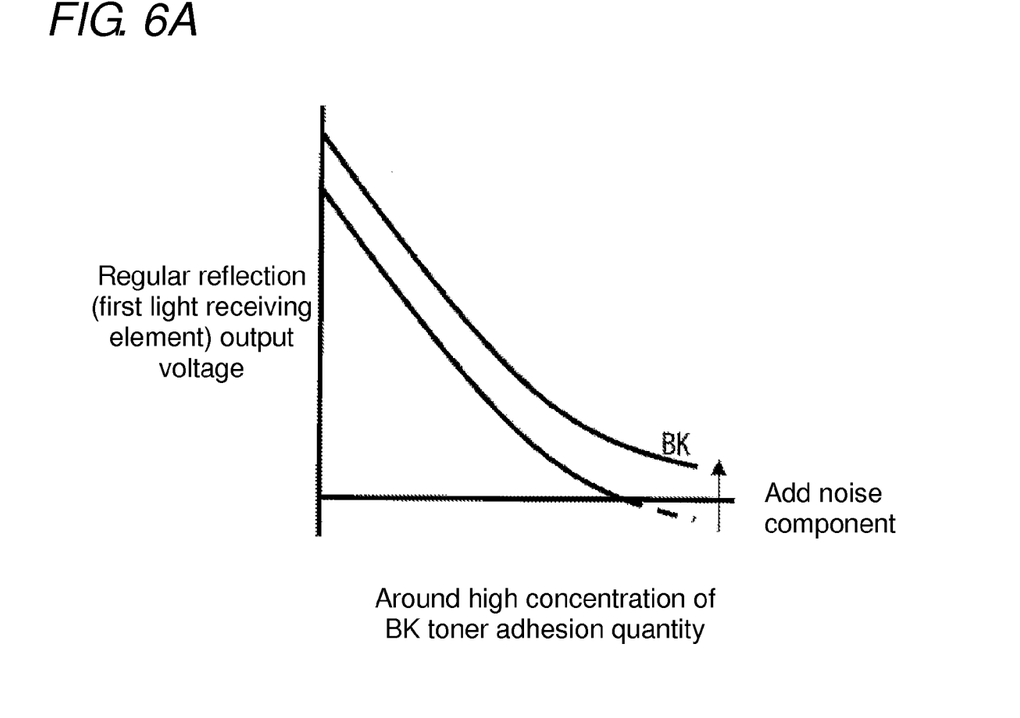
FIGS. 6A and 6B are diagrams illustrating the output results before and after correction to remove a noise component in the case of FIGS. 5A and 5B.
Figure 6B:
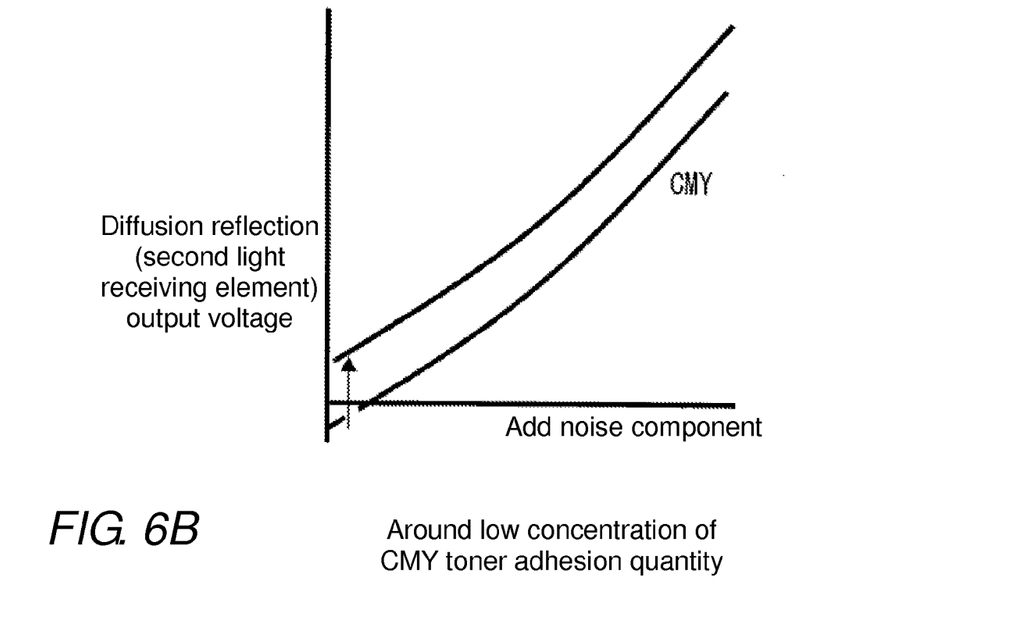

Solid line portions in FIGS. 5A, 5B indicate actual output results of first and second light receiving elements 3, 5. Moreover, dotted line portions in FIGS. 5A, 5B indicate estimated output results of first and second light receiving elements 3, 5, which are values that first and second light receiving elements 3, 5 driven by a signal power supply cannot output. Thus, actually, the output values of first and second light receiving elements 3, 5 are outputted as substantially 0 V at the time of non-lighting of light emitting element 1. That is, the influence by the dark current, the offset voltage/the bias current of the amplifier circuit, and the like make up the noise component of the −voltage. Accordingly, in order to eliminate the noise component, as illustrated in FIGS. 6A, 6B, correction needs to be performed, in which the noise component at the time of non-lighting of light emitting element 1 is added to the output value at the time of toner concentration sensing.

As described above, since the noise component of the −voltage at the time of non-lighting of light emitting element 1 is calculated beforehand by the mathematical operation method described later, and is recorded on the recording medium, the correction to eliminate the noise component is performed by using the value of the noise component recorded on the recording medium.

Moreover, the recording medium is, for example, a bar code or a QR code, and printing these codes in toner concentration sensor 10 allows these codes to be identified by a reading device or the like.

Figure 7:
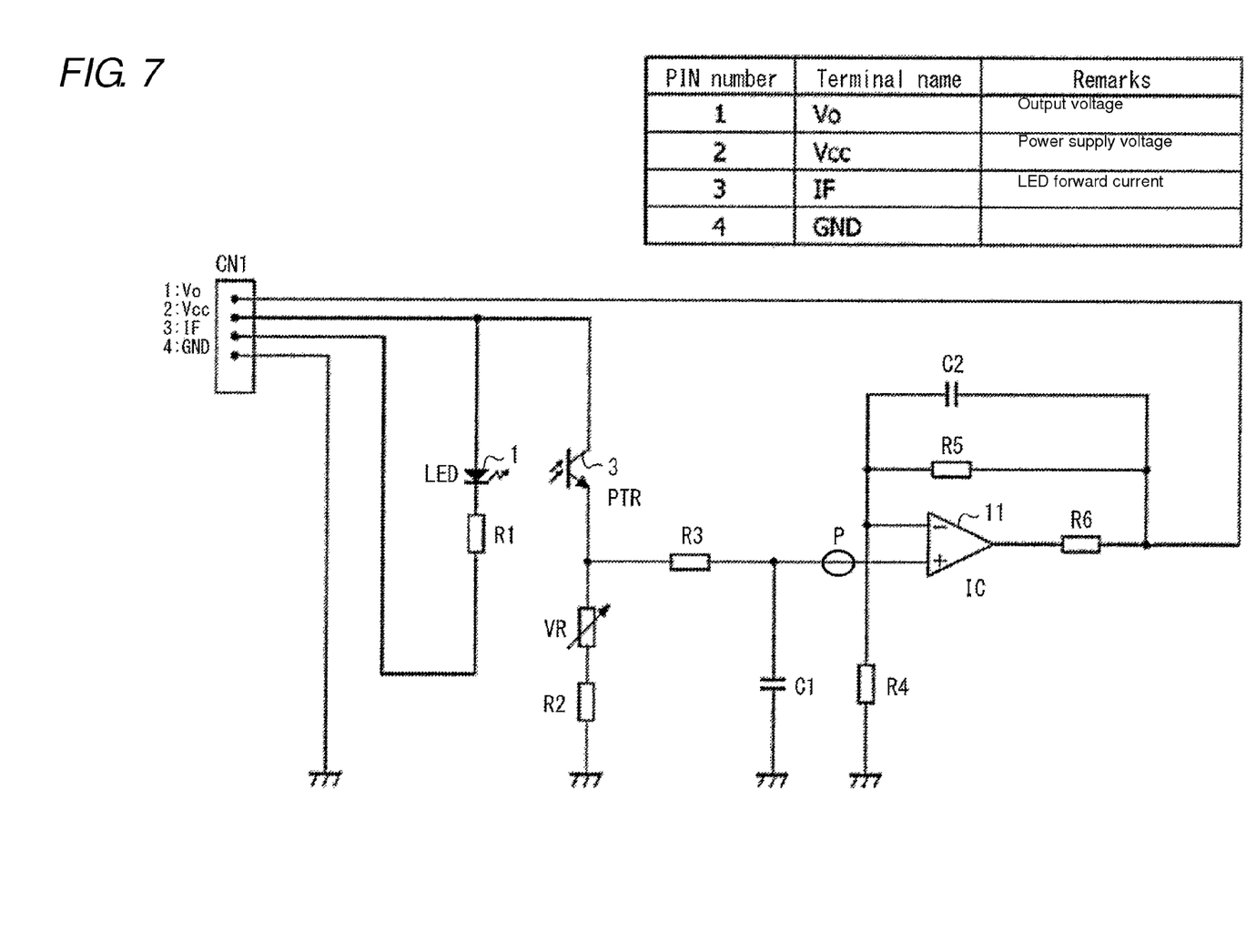
FIG. 7 is a block diagram illustrating one example of the toner concentration sensor in the embodiment.

Next, the mathematic operation method of the noise component will be described. FIG. 7 is a circuit diagram illustrating one example of the toner concentration sensor in the embodiment. Since a circuit illustrated in FIG. 7 has a well-known configuration, a detailed description is not given. Moreover, in the embodiment, first light receiving element 3 and second light receiving element 5 are switched on and the toner concentrations of BK and CMY are sensed and output as output values of first light receiving element 3 and second light receiving element 5, respectively. However, for convenience of description, one system including light emitting element 1 and first light receiving element 3 is illustrated and described herein.

Figure 8:
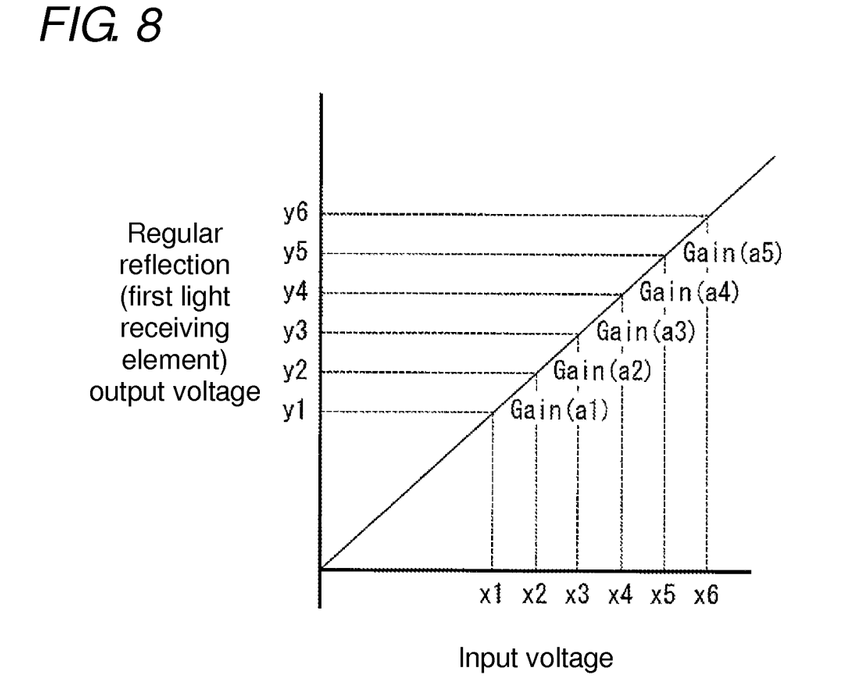
FIG. 8 is a diagram illustrating characteristics of input voltage-output voltage when a voltage is applied to an input terminal of an amplifier circuit (OP-AMP) in FIG. 7.

As illustrated in FIG. 7, a voltage outputted from light emitting element 1 is inputted to first light receiving element 3, and is amplified by OP-AMP 11 to be outputted. In the mathematic operation method of calculating the noise component, first, in point P, a voltage is applied to point P on an input side of OP-AMP 11 in a state where no voltage is applied to light emitting element 1, and output linearity is calculated from a relationship between an input voltage and output voltage. Specifically, different input voltages x1 to x6 are applied to point P to obtain output voltages y1 to y6, and characteristics of the input voltage—the output voltage (as illustrated in FIG. 8) are obtained. While in the embodiment, six different input voltages x1 to x6 are applied to point P, two or more different input voltages may be applied, or preferably three or more different input voltages may be applied to obtain the characteristics of the input voltage—the output voltage.

Next, an approximate line is calculated in an input voltage range in which linearity can be sufficiently assured. Specifically, an approximation formula of y=ax+b is assumed, and values of "a" and "b" are calculated based on the characteristics obtained in FIG. 8. Here, "a" indicates a gain value, and "b" indicates the noise component. Hereinafter, expressions (1), (2) are calculation formulae of "a" and "b".

$$a = \frac{n\sum_{k=1}^{n} x_k y_k - \sum_{k=1}^{n} x_k \sum_{k=1}^{n} y_k}{n\sum_{k=1}^{n} x_k^2 - \left(\sum_{k=1}^{n} x_k\right)^2} \quad (1)$$

$$b = \frac{\sum_{k=1}^{n} x_k^2 \sum_{k=1}^{n} y_k - \sum_{k=1}^{n} x_k y_k \sum_{k=1}^{n} y_k}{n\sum_{k=1}^{n} x_k^2 - \left(\sum_{k=1}^{n} x_k\right)^2} \quad (2)$$

The bar code, the QR code or the like indicating a value of "b" calculated by expression (2) as the noise component is printed in toner concentration sensor 10 so that the reading device or the like can identify the code. Thereby, the mathematic operation to properly correct the toner concentration when the image forming device is used can be performed.

In some range of the input voltage of OP-AMP 11, the linearity of OP-AMP 11 cannot be sufficiently obtained, and thus, it is desirable to carry out sampling in an area where the linearity can be sufficiently obtained. To ascertain the area where the linearity can be obtained, a gain value between two points is calculated according to any of the following expressions (3) to (6), and it is determined whether or not the value is included between a gain design value lower limit and a gain design value upper limit. The gain design value lower limit and the gain design value upper limit are calculated from an allowance of values of resistances mounted on the circuit (refer to expression (7)). If the gain value between the two points is between the gain design value lower limit and the gain design value upper limit, then the gain value is obtained from the area where the linearity can be obtained. Otherwise, the gain value is obtained from an area where the linearity cannot be obtained, and is excluded.

$$\text{Gain}(a1) = (y2-y1)/(x2-x1) \quad (3)$$

$$\text{Gain}(a2) = (y3-y2)/(x3-x2) \quad (4)$$

$$\text{Gain}(a3) = (y4-y3)/(x4-x3) \quad (5)$$

$$\text{Gain}(a4) = (y5-y4)/(x5-x4) \quad (6)$$

$$\alpha < \text{Gain}(an) < \beta (n=1 \text{ to } 4) \quad (7)$$

α: Gain design value lower limit

β: Gain design value upper limit

Figure 9:
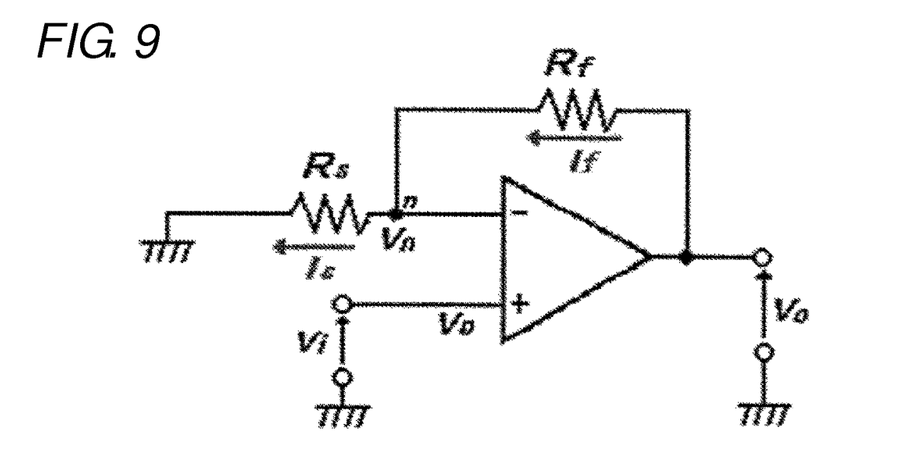
FIG. 9 is a diagram illustrating a configuration of non-inverting amplifier circuit.

For example, the gain design value lower limit and the gain design value upper limit can be calculated, using calculation formula (8) of an amplification factor with the allowance of the resistances of 1% in a circuit configuration illustrated in FIG. 9. That is, the gain design value lower limit can be calculated by expression (9), and the gain design value upper limit can be calculated by expression (10).

$$A_v = \frac{R_s + R_f}{R_s} = 1 + \frac{R_f}{R_s} \quad (8)$$

$$\alpha = 1 + \frac{R5 \times 0.99}{R4 \times 1.01} \quad (9)$$

$$\beta = 1 + \frac{R5 \times 1.01}{R4 \times 0.99} \quad (10)$$

Figure 10:
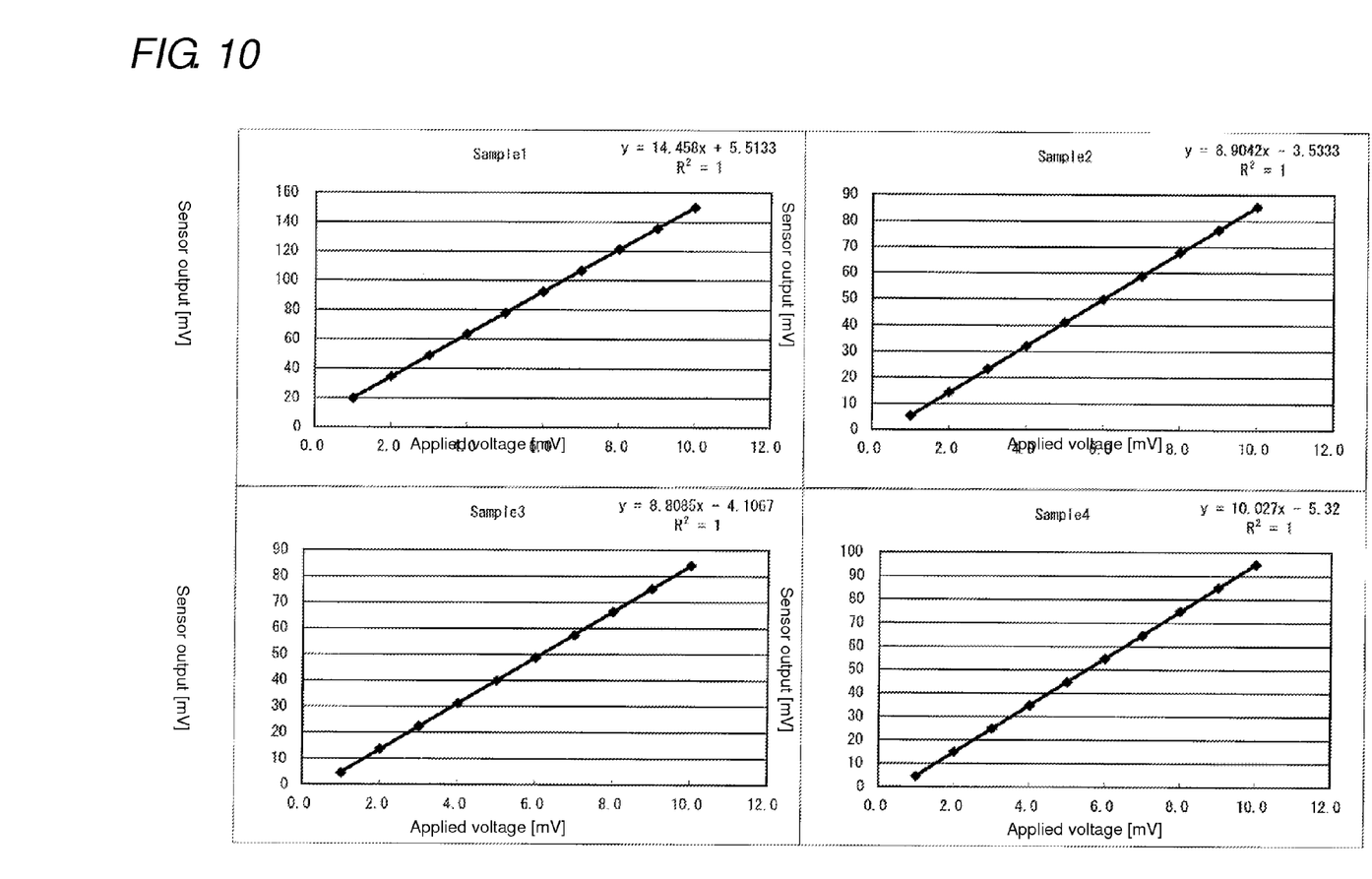
FIG. 10 shows diagrams illustrating measurement results of sensor output when a voltage of 1 to 10 mV is applied to the input terminal of the OP-AMP in FIG. 7 in units of 1 mV.

Next, verification of validity of the value of the noise component calculated by the above-described expressions (1), (2) will be described. Table 1 below shows measurement results of the sensor output when a voltage between 1 to 10 mV is applied to point P of the circuit in FIG. 7 in units of 1 mV. Here, verification is performed, using four samples No. 1 to No. 4 of the measurement results of the sensor output (see Table 1). FIG. 10 illustrates graphs of the measurement results in Table 1. Moreover, linear approximation formulae of samples No. 1 to No. 4 are calculated according to expressions (1), (2) and using the results in Table 1 (see expressions (11) to (14), respectively).

TABLE 1

Applied voltage - measurement results of sensor output

| | Applied voltage [mV] - sensor output mV] | | | | | | | | | |
|---|---|---|---|---|---|---|---|---|---|---|
| | 1.0 | 2.0 | 3.0 | 4.0 | 5.0 | 6.0 | 7.0 | 8.0 | 9.0 | 10.0 |
| No. 1 | 19.8 | 34.6 | 49 | 63.4 | 77.8 | 92.1 | 106.5 | 121.3 | 135.7 | 150.1 |
| No. 2 | 5.2 | 14.4 | 23.3 | 32.1 | 41 | 49.8 | 58.7 | 67.8 | 76.6 | 85.5 |
| No. 3 | 4.5 | 13.7 | 22.4 | 31.2 | 39.9 | 48.7 | 57.4 | 66.4 | 75.2 | 84 |
| No. 4 | 4.5 | 14.9 | 24.9 | 34.8 | 44.8 | 54.8 | 64.7 | 75 | 85 | 94.9 |

Sample 1: $y = 14.458x + 5.5133$ (11)
Sample 2: $y = 8.9042x - 3.5333$ (12)
Sample 3: $y = 8.8085x - 4.1067$ (13)
Sample 4: $y = 10.027x - 5.32$ (14)

Accordingly, the gains and the noise components (mV) of respective samples No. 1 to No. 4 are estimated based on expressions (11) to (14) and set out in Table 2 below.

TABLE 2

Gain/Noise component

| | Gain | Noise component [mV] |
|---|---|---|
| Sample 1 | 14.46 | 5.51 |
| Sample 2 | 8.90 | -3.53 |
| Sample 3 | 8.09 | -4.11 |
| Sample 4 | 10.03 | -5.32 |

Next, the resistance values of the sensor are directly measured to verify the validity of the estimated values in Table 2, using expression (15). In Table 3, the measured values of samples No. 1 to No. 4 and the estimated values shown in Table 2 are summarized.

$$\text{GAIN} = 1 + (R5)/R4 \quad (15)$$

TABLE 3

Confirmation of validity of circuit gain

| | Measured value | Estimated value | Actual/estimated |
|---|---|---|---|
| Sample 1 | 14.56 | 14.46 | 100.7% |
| Sample 2 | 8.99 | 8.90 | 101.0% |
| Sample 3 | 8.89 | 8.80 | 101.0% |
| Sample 4 | 10.08 | 10.03 | 100.5% |

Moreover, an inverted input terminal and an output terminal of OP-AMP 11 are connected to set up a voltage follower circuit, and then, the output value (when 10 mV is applied to point P) is measured to verify the validity of the estimated value of the noise component, using expression (16). In Table 4, the measured values of the noise component calculated based on expression (16), and the estimated values shown in Table 2 are summarized.

$$\text{Offset measured value} = (\text{Output value} - 10 \text{ mV}) * \text{Gain} \quad (16)$$

TABLE 4

Confirmation of noise component validity

| | Measured value [mV] | Estimated value [mV] | Actual/estimated | Output value [mV] | Difference [mV] |
|---|---|---|---|---|---|
| Sample 1 | 5.68 | 5.51 | 103.1% | 10.39 | 0.39 |
| Sample 2 | -3.33 | -3.53 | 94.2% | 9.63 | -0.37 |

TABLE 4-continued

Confirmation of noise component validity

| | Measured value [mV] | Estimated value [mV] | Actual/estimated | Output value [mV] | Difference [mV] |
|---|---|---|---|---|---|
| Sample 3 | -4.09 | -4.11 | 99.5% | 9.54 | -0.46 |
| Sample 4 | -5.04 | -5.32 | 94.7% | 9.5 | -0.5 |

As described above, as shown in Tables 3, 4, error rates of the estimated values of the noise component are about 5% with respect to the measured values, and it can be confirmed that the estimated values are valid values.

Figure 11:
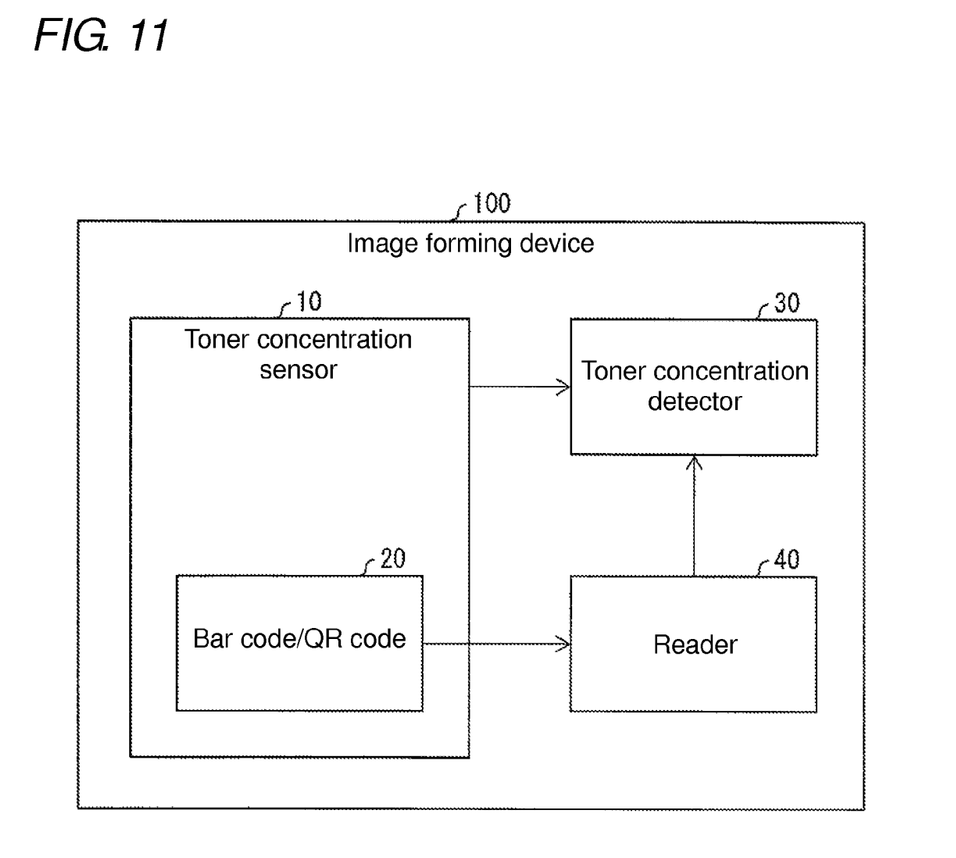
FIG. 11 is a block diagram illustrating one example of a configuration of an image forming device having the toner concentration sensor in the embodiment.

Next, a case where toner concentration sensor 10 in the embodiment is mounted on the image forming device will be described. FIG. 11 is a block diagram illustrating one example of a configuration of the image forming device having the toner concentration sensor in the embodiment.

As illustrated in FIG. 11, image forming device 100 includes toner concentration detector 30 and reader 40 in addition to toner concentration sensor 10 having bar code/QR code 20. Reader 40 reads correction information indicating the noise component included in bar code/QR code 20 to output the same to toner concentration detector 30.

When the correction information is inputted from reader 40, toner concentration detector 30 detects the toner concentration in the toner adhesion area from the output voltage of the toner concentration sensor 10, and corrects the output using the correction information. Specifically, when the correction information indicates a plus noise component, the noise component indicated by the correction information is subtracted from the output value of toner concentration sensor 10 to correct the toner concentration. When the correction information indicates a minus noise component, the noise component indicated by the correction information is added to the output value of toner concentration sensor 10 to correct the toner concentration.

The present invention is not limited to the above-described embodiment. Various modifications made within a range described in the claims, and embodiments obtained by combining technical means disclosed herein as needed, are also included in the technical range of the present invention.

The present invention is devised to solve the above-described problems, and one object of the invention is to provide an optical sensor and a method for correcting a toner concentration capable of increasing detection accuracy without increasing the number of parts and narrowing the dynamic range.

Another object of the invention is to provide an image forming device high in toner-concentration detection accuracy without deterioration in performance and increase in cost.

According to an embodiment of the present invention, information indicating the noise component is obtained from the characteristics of the input voltage and the output voltage of the amplifier circuit. Using the information, a sensor output value can be precisely corrected even if the sensor is driven by a single power supply. This makes it unnecessary to provide an additional part to adjust the noise component in an image forming device.

Moreover, since the sensor output value can be precisely corrected even if the sensor is not driven by a dual power supply, the correction can be performed without narrowing a dynamic range of the sensor. Accordingly, an optical sensor capable of increasing detection accuracy without increasing the number of parts and without narrowing the dynamic range is provided.

Moreover, in the optical sensor of the present invention, the information indicates the noise component calculated, based on the characteristics of the input voltage and the output voltage of the amplifier circuit, the characteristics being obtained by applying a plurality of different input voltages to the amplifier circuit.

Accordingly, accuracy of calculation of the noise component is increased.

Moreover, according to an embodiment of the present invention, a bar code or a QR code (registered trademark) indicating the information is printed in the optical sensor.

Moreover, in the optical sensor of the present invention, the information indicates a minus noise component.

According to the above-described configuration, adding the minus noise component to the output value of the sensor enables the sensor output value to be precisely corrected.

In order to solve the above-described problems, there is provided an image forming device of the present invention includes the optical sensor, and a toner concentration detector configured to detect a toner concentration in the object area, based on the output voltage of the optical sensor, and the toner concentration detector corrects the toner concentration according to indicated information of the noise component present in the optical sensor.

According to the above-described configuration, there can be provided an image forming device high in toner-concentration detection accuracy without deterioration in performance and increase in cost.

Further, in order to solve the above-described problems, in a method for correcting a toner concentration of the present invention, there is provided an optical sensor that is configured to irradiate an object area with light and receive reflected light, and amplify a voltage in accordance with the reflected light by an amplifier circuit to output a resulting voltage, and the method includes steps of calculating a noise component, based on characteristics of an input voltage and an output voltage of the amplifier circuit, and correcting the toner concentration, based on the calculated noise component.

According to the above-described configuration, the method for correcting a toner concentration is capable of increasing detection accuracy without increasing parts in number and without narrowing a dynamic range.

Further, the present invention exerts an effect of increasing detection accuracy without increasing the number of parts and without narrowing a dynamic range.

The invention claimed is:

1. An optical sensor configured to irradiate an object area with light and receive reflected light, amplify a voltage in accordance with the reflected light by an amplifier circuit and output a resulting voltage, the optical sensor comprising:
    a medium recorded with information indicating a noise component of the resulting voltage, the medium being a bar or a QR code printed on the optical sensor.

2. The optical sensor according to claim 1, wherein the information indicates a minus noise component.

3. An image forming device comprising:
    the optical sensor according to claim 1; and
    a toner concentration detector configured to detect a toner concentration in the object area, based on the resulting voltage of the optical sensor, wherein the toner concentration detector corrects the toner concentration based on the information.

4. An image forming device comprising:
    the optical sensor according to claims 2; and
    a toner concentration detector configured to detect a toner concentration in the object area based on the resulting voltage of the optical sensor;
    wherein the toner concentration detector corrects the toner concentration based on the information.

5. A method for correcting a toner concentration, using an optical sensor configured to irradiate an object area with light, receive reflected light, amplify a voltage in accordance with the reflected light by an amplifier circuit, and output a resulting voltage, the method comprising:
    recording information indicating a noise component of the resulting voltage on a medium, the medium being a bar code or a QR code printed on the optical sensor and, correcting the toner concentration based on the information.

* * * * *